United States Patent
Oostergo et al.

(10) Patent No.: US 10,313,284 B1
(45) Date of Patent: Jun. 4, 2019

(54) UPLOAD AND SHARE FILES TO A SHARING SERVICE USING A MESSAGING CLIENT

(71) Applicant: Amazon Technologies, Inc., Seattle, WA (US)

(72) Inventors: Milo Oostergo, The Hague (NL); Floor Mesters, The Hague (NL); Ivo van Doorn, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 14/571,104

(22) Filed: Dec. 15, 2014

(51) Int. Cl.
  *H04L 12/58* (2006.01)
  *H04L 29/06* (2006.01)
  *G06F 3/0482* (2013.01)

(52) U.S. Cl.
  CPC ............ *H04L 51/08* (2013.01); *G06F 3/0482* (2013.01); *H04L 65/403* (2013.01)

(58) Field of Classification Search
  CPC ...... H04L 51/08; H04L 65/403; G06F 3/0482
  See application file for complete search history.

(56) References Cited

U.S. PATENT DOCUMENTS

| | | | | |
|---|---|---|---|---|
| 2006/0265458 A1* | 11/2006 | Aldrich | ................ | G06Q 10/107 709/206 |
| 2009/0112995 A1* | 4/2009 | Addae | ................ | G06Q 10/107 709/206 |
| 2010/0082713 A1* | 4/2010 | Frid-Nielsen | ......... | G06F 17/301 707/821 |
| 2013/0212112 A1* | 8/2013 | Blom | ................ | G06F 17/30115 707/741 |
| 2013/0226975 A1* | 8/2013 | Lee | ..................... | G06F 17/3007 707/821 |

* cited by examiner

*Primary Examiner* — Roland J Casillas
(74) *Attorney, Agent, or Firm* — Lee & Hayes, P.C.

(57) ABSTRACT

Functionality is disclosed herein for uploading files to a sharing service using a messaging client. Utilizing the technologies described herein, a user may select one or more files to be shared by utilizing a messaging interface configured to compose an electronic message, such as an email. In response to receiving a selection of one or more files to be shared, the selected files are communicated to a sharing service where the selected files are stored on one or more servers. In addition, some configurations generate one or more links operative to provide access the one or more files stored on the servers of the sharing service. The links are then inserted into the electronic message. Using an implementation of the technologies disclosed herein, users may share files using a sharing service while composing a message without the need to interact with different controls or interfaces of multiple services.

20 Claims, 10 Drawing Sheets

UPLOAD AND SHARE FILES TO A SHARING SERVICE USING A MESSAGING CLIENT

BACKGROUND

Many users depend on electronic mail ("email") to send messages and share files. In some scenarios, users may add attachments to emails to share files with other users. Some attachments may be relatively small in size (e.g., less than 1 MB) whereas other attachments may be relatively large (e.g., greater than 5 MB). Given the size of most attachments, in addition to the fact that some users exchange a large number of emails per day, existing practices utilizing email attachments may demand a significant amount of communication and storage resources. This scenario presents budgetary and resource challenges for both large and small businesses.

In addition, the use of email attachments creates complex scenarios for users when it comes to version control of shared files. For instance, it may be difficult for some users to identify the most recent version of a document particularly when multiple users are communicating individual versions of the document on different email threads. To address some of the existing drawbacks created by the use of email attachments, some users share data by storing files on a central server and sharing links to the files. Although there are different systems for sharing files and messages, coordination between different systems may be cumbersome for users.

DETAILED DESCRIPTION

Figure 1:
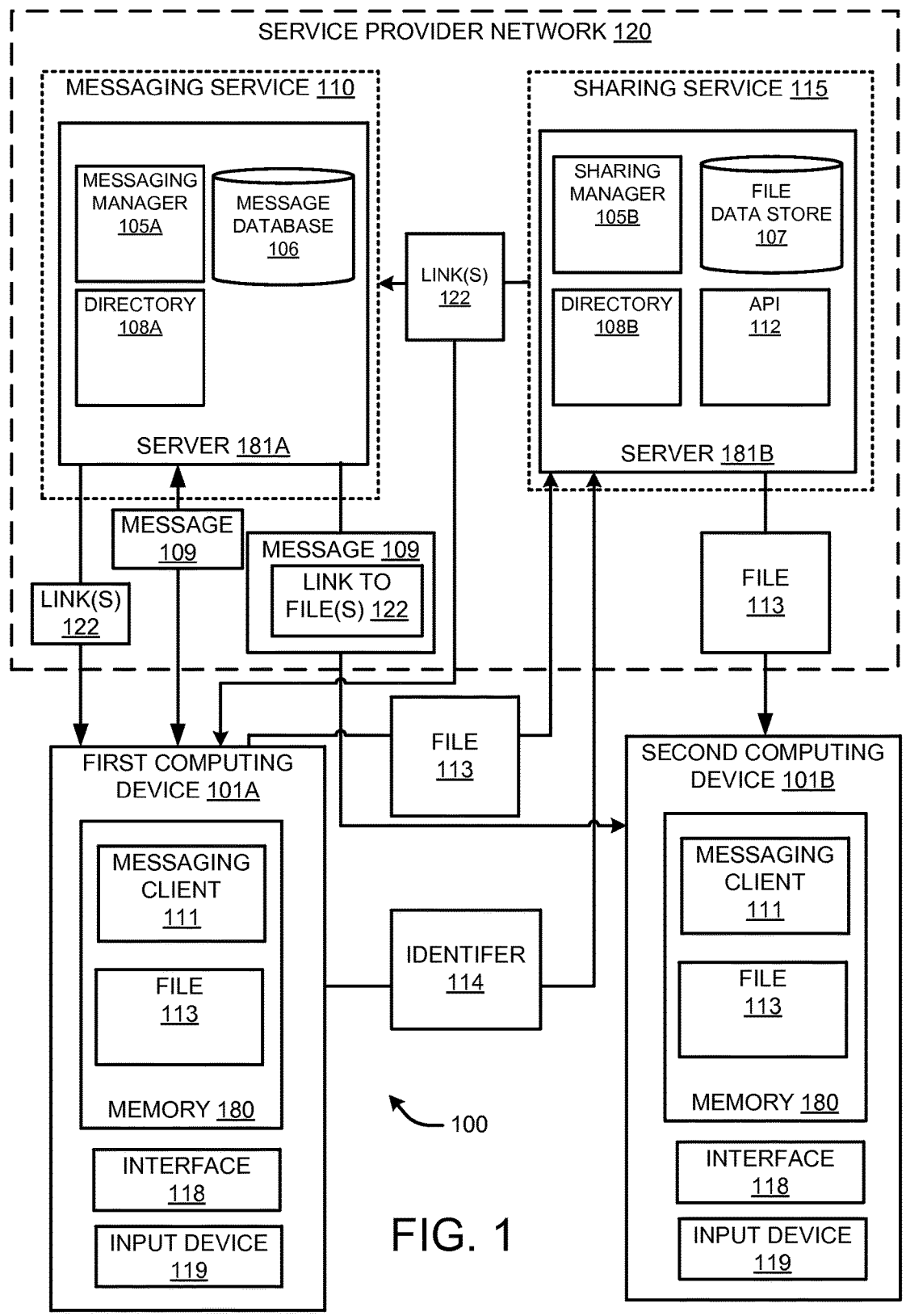
FIG. 1 is a block diagram depicting an illustrative framework in which enhanced file sharing controls may be provided in a messaging client.

The following detailed description is directed to concepts and technologies for uploading files to a sharing service using a messaging client. Utilizing the technologies described herein, a user may select one or more files to be shared while utilizing a messaging interface configured to compose an electronic message, such as an email. In response to receiving a selection of files to be shared, the selected files are communicated to a sharing service where the selected files are stored on one or more servers. In addition, some configurations generate hyperlinks ("links") operative to provide access to the selected files communicated to and stored on the servers of the sharing service. The links may be inserted into the electronic message that is being composed. Through an implementation of the technologies disclosed herein, users may share files using a sharing service while composing a message using a messaging service without the need to interact with different controls and/or interfaces of multiple services. The sharing service can also be referred to as a "collaboration service," since at least some embodiments of the sharing service can allow users to work together on a document. For example, users can exchange different versions of a document, while providing comments on the document.

In some configurations, a framework may include a messaging service and a sharing service. A messaging client may operate in conjunction with the messaging service to cause the display a user interface ("UI") that may be utilized by a user composing a message. The UI may also include controls configured to select files to be stored by the sharing service. When the user selects the stored files to be shared (e.g., with the recipient of the message or some other users), the messaging client communicates the selected files to the sharing service for storage. The sharing service may then generate one or more links operative to provide access to the selected files stored at the sharing service. As discussed briefly above, in some configurations, the links may be integrated into the message and operative to allow the recipient of the message to select the link to access the selected files. Additional details regarding the various components and processes described above for providing enhanced file sharing controls in a messaging client will be presented below with regard to FIGS. 1-10.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the technologies described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a block diagram depicting an illustrative framework 100 in which sharing options for files accessible through a sharing service may be specified using a messaging client. In some configurations, the framework 100 includes a messaging service 110 and a separate sharing service 115. In other configurations, a single service or more than two services might be utilized to provide the functionality described herein as being provided by the messaging service 110 and/or the sharing service 115. The messaging service 110 and the sharing service 115 may respectively manage the communication, sharing, and storage of messages and files between computing devices, such as a first computing device 101A and a second computing device 101B (also referred to herein generically and collectively as "computing devices 101").

For illustrative purposes, two computing devices 101 are shown in FIG. 1. Fewer or more computing devices 101 might be used in other implementations of the described techniques. According to some configurations, the messaging service 110, the sharing service 115 and the computing devices 101 are interconnected through one or more local and/or wide area networks (not shown). The functionality described herein may be provided by a service provider operated network-based distributed computing environment (which may be referred to herein as a "service provider network" 120). In some configurations, the messaging service 110 and/or the sharing service 115 may be implemented within the service provider network 120.

As described in more detail below, the service provider network 120 may include a collection of rapidly provisioned and, potentially, released computing resources. The computing resources may include a number of computing, networking and storage devices in communication with one another. In some configurations, the computing resources may correspond to physical computing devices. In other configurations, the computing resources may correspond to virtual machine instances implemented by one or more physical computing devices. In still other configurations, computing resources may correspond to both virtual machine instances and physical computing devices. The operator of the service provider network 120 may charge for the use of computing resources.

In some configurations, the messaging service 110 may be provided by one or more computing devices, such as server computing devices, or some other computing device or devices configured to perform the techniques described herein. For illustrative purposes, configurations of the messaging service 110 may include a server 181A storing a messaging manager 105A, a message database 106 and a directory 108A. The messaging manager 105A may access permission data stored in the directory 108A for controlling user access to messages and other data stored in the message database 106. The messaging manager 105A may be configured to manage the communication of messages 109 between one or more computing devices 101.

The sharing service 115 may be provided by one or more computing devices, such as server computing devices, or some other computing device or devices configured to perform the techniques described herein. For illustrative purposes, configurations of the sharing service 115 may include a server 181B storing a sharing manager 105B, a file data store 107 and a directory 108B. The sharing manager 105B may access permission data stored in the directory 108B for controlling user access to files and other data stored in the file data store 107. For illustrative purposes, the directory 108A of the messaging service 110 and the directory 108B of the sharing service 115 may be referred to herein collectively and generically as a "directory 108" or "directories 108." The sharing manager 105B may be configured to manage the communication of data associated with the files 113 between one or more computing devices 101. In addition, as described in more detail below, the messaging service 110 and the sharing service 115 may coordinate through one or more communication interfaces to manage the communication of messages 109 and files 113 via a message client interface.

The computing devices 101 may each include memory 180 storing a file 113 and a messaging client 111. The computing devices 101 may also include a display interface 118 and an input device 119. The messaging client 111 may be configured to communicate with the messaging service 110 to receive, compose and send messages 109. In some examples, the messaging client 111 of each computing device 101 may be configured to instruct the sharing service 115 to store of one or more files, such as the file 113. The messaging client 111 may be in the form of a stand-alone application or any other application or software module having features that interact with a user the messaging service 110 and the sharing service 115 via one or more devices, such as the input device 119 and the display interface 118. The input device 119 may be any device, such as a keyboard, and/or the display interface 118, which may include a touch-enabled screen configured to receive gestures from one or more users.

In some examples, the messaging service 110 and/or the messaging client 111 may cause the display of a message interface on the first computing device 101A. The message interface may include an editable text field and controls for associating a file (e.g. file 113 and/or a file already stored by the sharing service 115) with a message 109. In particular, a user may select one or more files and associate the one or more selected files with the message 109. Upon receiving the selection of the one or more files 113, the first computing device 101A may communicate one or more selected files to the sharing service 115. The sharing service 115 may then generate one or more hyperlinks ("links") 122 that can be utilized to access the selected files stored by the sharing service 115. The sharing service 115 may communicate the one or more links to the messaging service 110 and/or the messaging client 111 where the one or more links are inserted or integrated into the message 109.

In some scenarios, the one or more selected files 113 may not be stored by the sharing service 115, or the files 113 stored on the sharing service 115 may not include current versions of the one or more selected files 113. In such scenarios, one or more modules, such as the sharing manager 105B, may determine if the sharing service 115 is storing a current version of the one or more selected files. If it is determined that the one or more selected files are not stored at the sharing service 115 or if the sharing service 115 is not storing a current version of the one or more selected files 113, the first computing device 101A may communicate one or more selected files to the sharing service 115. The first computing device 101A may cause any other computing device storing the one or more selected files 113 to communicate the one or more selected files 113 to the sharing service 115. In some cases, the sharing service 115 might access a local storage of the first computing device to retrieve the one or more selected files 113. Although this illustrative example utilizes the sharing manager 105B, any other module or combination of modules may be used. For instance, APIs of the sharing service 115 may be accessed by any module, such as the messaging client 111, to implement the techniques disclosed herein.

If it is determined that the sharing service 115 is storing a current version of the selected files 113, the first computing device 101A may communicate data identifying the selected files to the sharing service 115. For instance, the first computing device 101A might transmit data that identifies the selected files, such as the file identifier 114 shown in FIG. 1. In configurations where the sharing service 115 generates the links 122 for the selected files 113, the sharing service 115 may utilize the received file identifier 114 to generate the links 122 operative to provide access to the selected files 113. The sharing service 115 may communicate the links 122 to the messaging service 110 and/or the messaging client 111 where the links 122 are inserted or integrated into the message 109.

In some configurations, the messaging service 110 and/or the messaging client 111 may obtain the links 122 that can be utilized to access the selected files 113 stored by the sharing service 115. The messaging service 110 and/or the messaging client 111 may integrate the generated links 122 into the message 109 without user interaction. As shown in FIG. 1, if the links 122 are generated at the sharing service 115, the links 122 may be communicated from the sharing service 115 to the messaging service 110, allowing the messaging service 110 to integrate the link 122 into the message 109. In addition, or alternatively, the one or more links 122 may be communicated from the sharing service 115 to the messaging client 111 of a computing device 101, allowing the messaging client 111 to integrate the links 122 into the message 109.

Although these examples involve the use of one or more links 122, it can be appreciated that other data for identifying, locating and/or providing access to stored files may be utilized by the techniques described herein. For instance, an identifier associated with a stored file 113, or any other access data suitable for providing access to the stored files, may be communicated from the sharing service 115 to the messaging service 110 and/or the messaging client 111. Once the identifier 114 associated with a stored file 113 is communicated, the messaging service 110 and/or the messaging client 111 insert or integrate the identifier into a message 109. Any known technology for inserting or integrating an identifier that it configured to provide access to the one or more selected files 113 may be used with techniques disclosed herein. In addition, in some configurations, the messaging service 110 and/or the messaging client 111 may receive and utilize the identifier 114 or other data from the sharing service 115 to generate the one or more links 122 at the client computing device 101 and/or at the server 181A of the messaging service 110.

When a user selects a control to send the message 109, the message 109 including the link 122 might be communicated from the first computing device 101A to the second computing device 101B. The communication of the message 109 may be processed by the messaging service 110 or any other service that is configured to communicate messages.

Once delivered, the message 109 and the link 122 may be displayed on the interface 118 of the second computing device 101B. A user of the second computing device 101B may select the link 122 included in the message 109 to initiate the communication of data associated with the file 113 from the sharing service 115 to the second computing device 101B. According to some configurations, the sharing service 115 exposes one or more network application programming interfaces ("APIs"), such as the API 112. The API 112 can be accessed by various devices in communication with the sharing service 115 to access the functionality for setting options and configurations for the messaging client 111. The API 112 may be configured to support various protocols for various devices. In addition, the API 112 may be used to communicate data, such as the file 113, between the sharing service 115 and other computing devices, such as the first computing device 101A or the second computing device 101B.

The techniques described herein enable users to associate one or more selected files 113 with a message 109 that are to be shared with one or more other users from a single message client interface. By providing a message client interface with one or more controls that enable to a user to share a file 113 stored by a service, such as the sharing service 115, users can share files with recipients of the message 109 without the need to switch to another application interface.

Figure 2A:
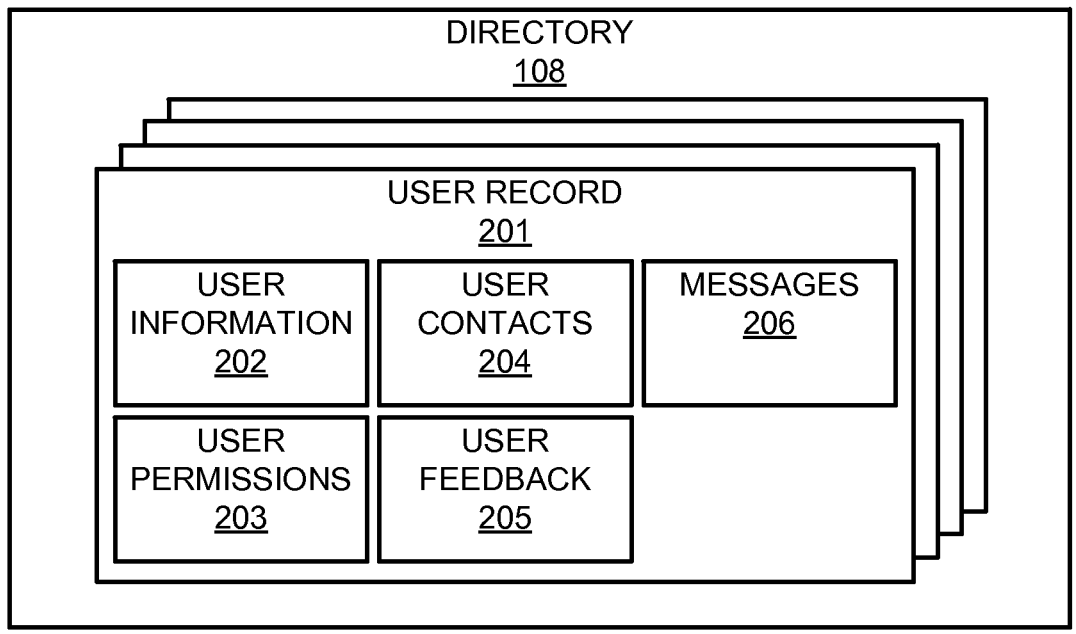
FIG. 2A is a block diagram depicting a directory.
Figure 2B:
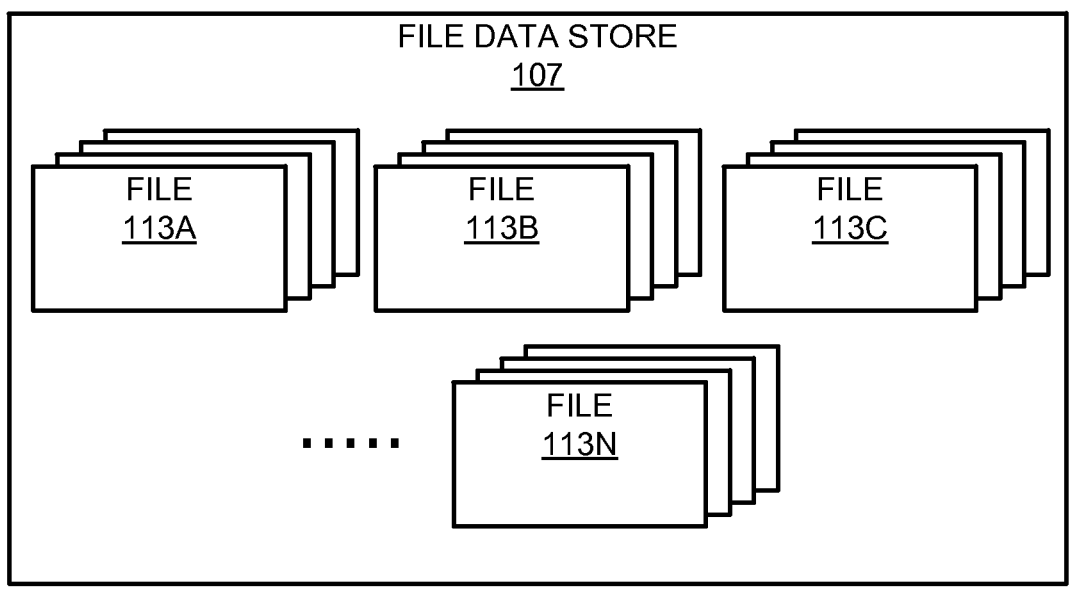
FIG. 2B is a block diagram depicting a file data store.

FIG. 2A is a block diagram depicting a directory 108 and FIG. 2B is a block diagram depicting the file data store 107 that might be utilized by the messaging service 110 and/or the sharing service 115. In some configurations, the directory 108 illustrated in FIG. 2A may include a number of records for defining access rights and permissions for users and/or identities accessing data stored by the sharing service 115 and possibly by the messaging service 110. As illustrated in FIG. 2A, an individual user record 201 may include the storage and/or association with different types of data, including, but not limited to user information 202, user permissions 203, user contacts 204, and user feedback 205. In some configurations, the user information 202 may store general identification information such as a user's name, email address, phone number and other contact information.

The user permissions 203 may contain one or more data structures for defining access rights to individual records, emails or files or other data. According to some examples, data defining access rights may be based on a per user and per record basis. Thus, individual files, directories, emails, feedback comments or other data may be controlled by the user permissions 203. The user contacts 204 may include a list of email addresses, phone numbers and identification information for other users. In some configurations, the user record 201 may include user feedback 205, which may include comments, notes and other data associated with files 113 stored in the file data store 107.

In some configurations, the directory 108 may include more or fewer types of data. In addition, for the sharing service 115, the directory 108 may contain a subset of the data types shown in the example of FIG. 2A. For instance, the directory 108B of the sharing service 115 may only include and/or utilize the user information 202 and user permissions 203.

The file data store 107 illustrated in FIG. 2B may include the storage of files 113A-113N, which are also referred to herein individually and generically as a "file 113" or "files 113." In some configurations, the file data store 107 may store different versions for each file 113A-113N, allowing users to select, edit, communicate and/or process newer or older versions of each file 113. In some configurations, among many other features, the file data store 107 may also store other types of data, such as the user feedback 205. In such configurations, the user feedback 205 may be stored in the files, or in other data fields.

Turning now to FIGS. 3-6, different examples of graphical user interfaces are illustrated as screen diagrams that display information relating to techniques for providing enhanced file sharing controls in a messaging client. In addition, the examples disclosed herein provide techniques for uploading files to a sharing service using a messaging client. The screen diagrams presented are for illustrative purposes only, and are not intended to be limiting. For example, other visual interface as well as non-visual interfaces (e.g., voice, touch) might be utilized to perform the functionality described herein.

Figure 3:
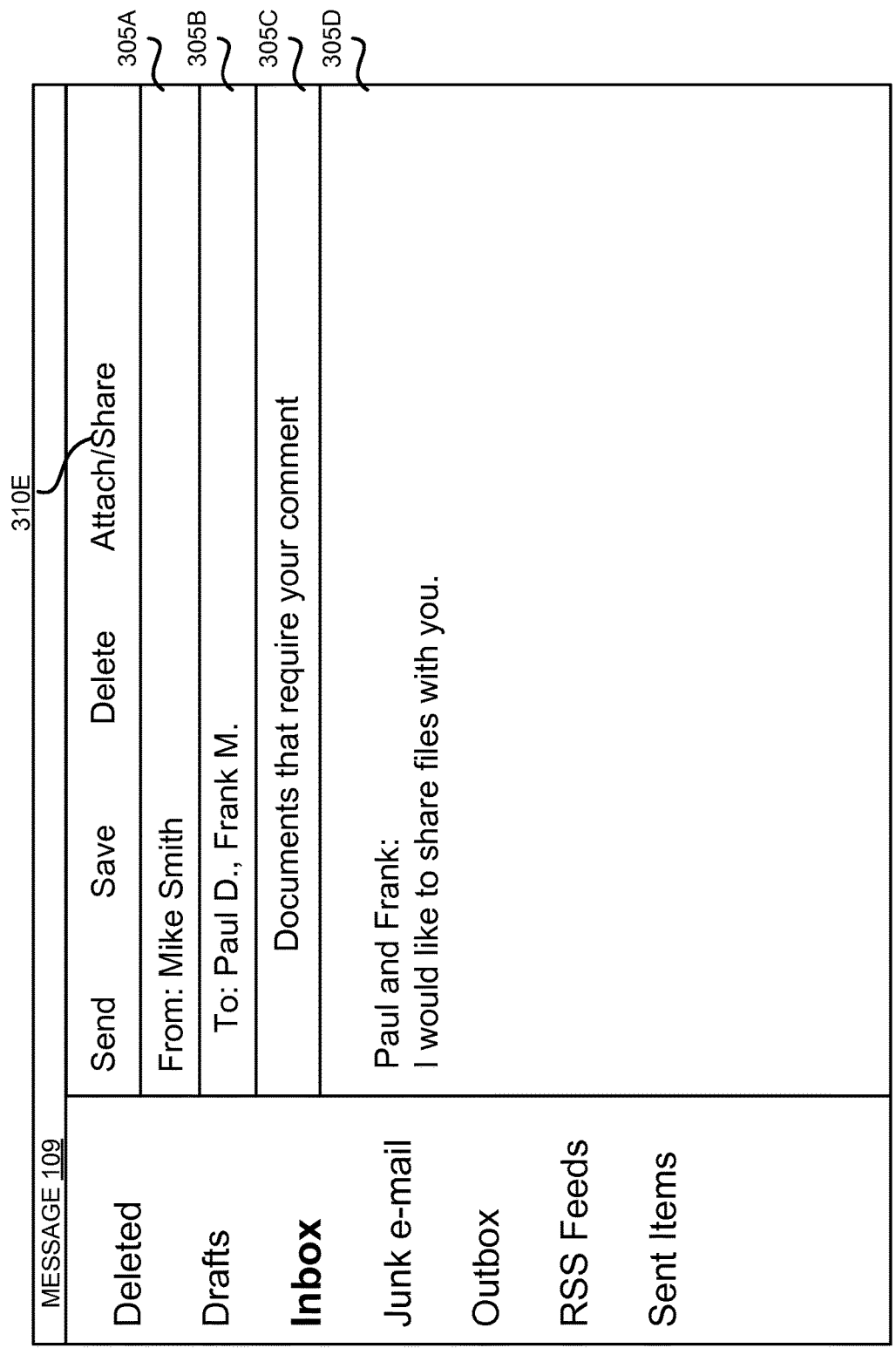
FIG. 3 is a screen diagram showing an illustrative graphical user interface that is configured to receive and process data for composing a message.

FIG. 3 is a screen diagram showing an illustrative graphical UI 300 that displays data relating to techniques for controlling the communication and storage of files to a sharing service while composing a message 109. The UI 300 may be generated by the messaging client 111, shown in FIG. 1, and presented on a computing device, such as the computing device 101A or 101B by an application, such as a web browser application.

As illustrated in FIG. 3, the UI 300 includes a display of the message 109 being composed. In the current example, the message 109 includes a "from" UI element 305A showing the sender of the message 109, a "recipient" UI element 305B for specifying the recipients of the message 109, a "subject" UI element 305C for specifying the subject of the message 109, message area UI element 305D for entering text of the message 109, and a "share" UI element 310E for specifying one or more files 113 to share.

Figure 4:
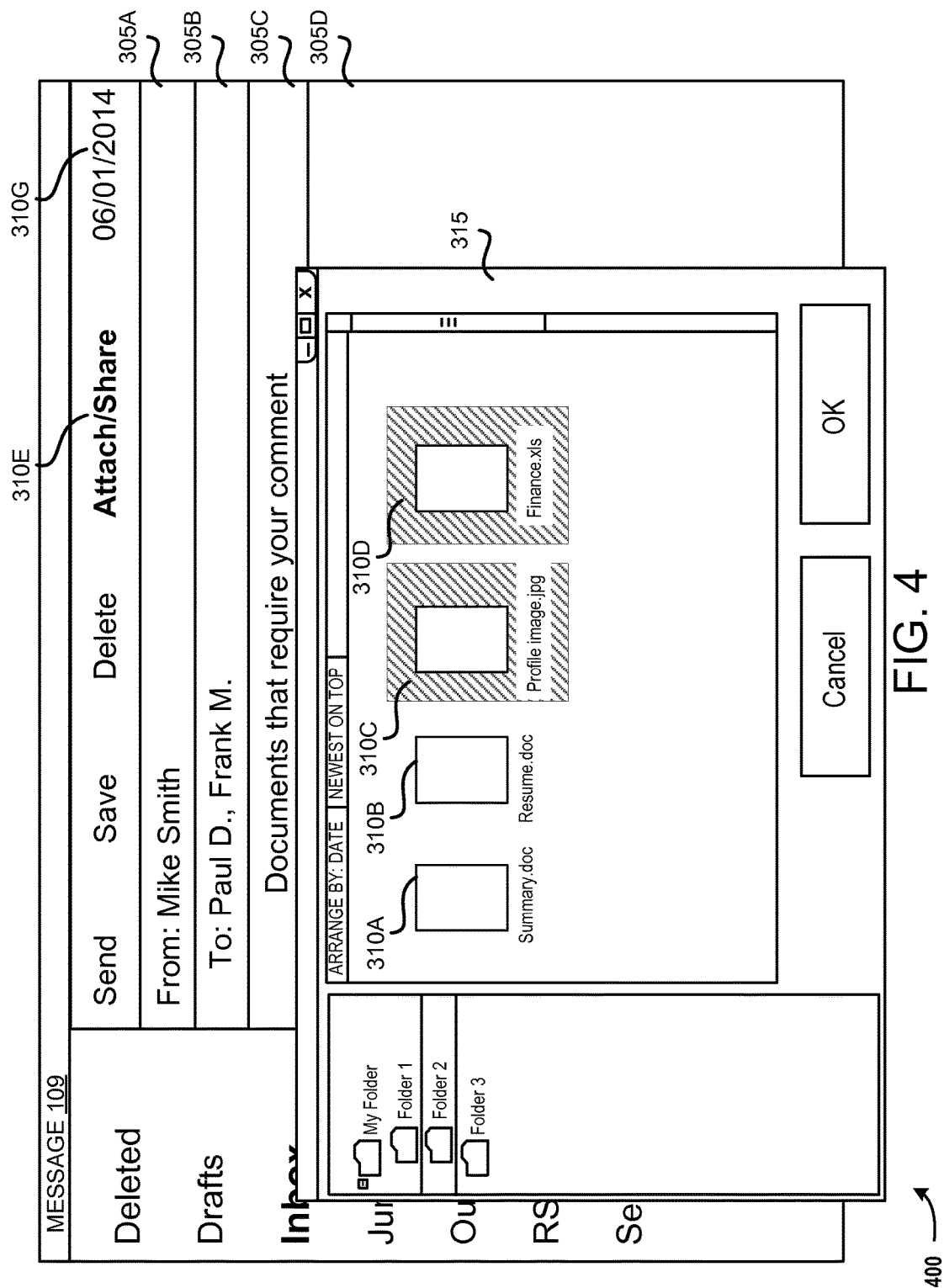
FIG. 4 is a screen diagram showing an illustrative graphical user interface that may display data relating to selecting one or more files to share while composing a message.

A user may select the "share" UI element 310E to share one or more files 113. In response to receiving a user the selection of the "share" UI element 310E to share one or more files 113, the messaging client 111 may generate one or more UI elements to display stored files to the user and provide controls for the user to select files from the displayed list of files. FIG. 4 illustrates one non-limiting example of a UI element for displaying and allowing the selection of the stored files.

FIG. 4 is a screen diagram showing an illustrative graphical UI 400 for displaying a list of stored files 310A-310D and providing controls for allowing a user to select individual files from the displayed list of files 310A-310D. In this example, a file selection UI element 315 is displayed in response to the user selecting the share UI element 310E. As illustrated, the file selection UI element 315 displays a list of stored files 310A-310D. For illustrative purposes, two of the files are highlighted to represent a user selection of two files 113 for sharing. The first selected file 113 is the "profile image.jpg" file represented by file UI element 310C. The second selected file 113 is the "finance.xls" file represented by file UI element 310D. As can be appreciated, different UI elements, controls or mechanisms may be used to display and select the files to be shared. For example, the graphical UI 300 illustrated in FIG. 3 may be configured to allow a user to drag and drop a selected file to a location within the message 109. The files illustrated in the file selection UI element 315 may be stored on a local data store or a network data store. For example, the files might be stored by the first computing device 101A, the second computing device 101B or stored by the sharing service 115.

After the user has selected the files 113 to be shared, the user may select one or more controls, such as the "OK" button. In response to selecting the "OK" button, the file selection UI element 315 may close. Once files 113 are selected for sharing, the messaging client 111 determines the location of the selected files 113. As summarized above, the selected files 113 may be stored locally or the selected files 113 may be stored by the sharing service 115. If the selected files 113 are stored locally and not stored by the sharing service 115, or if the sharing service 115 does not have current versions of the selected files 113, the messaging client 111 may communicate the selected files 113 from the client computing device 101 to the sharing service 115 for storage. For example, the messaging client 111 may utilize the API 112 to communicate the selected files 113 to the sharing service 115.

If the selected files 113 are already stored by the sharing service 115, the messaging client 111 may communicate data identifying the selected file 113, such as the file identifier 114 shown in FIG. 1. In configurations where the sharing service 115 generates the one or more links 122 for the selected files 113, the sharing service 115 may utilize the received file identifier 114 to generate the one or more links 122.

As also described above, the sharing service 115 may then obtain or generate the one or more links 122 operative to access the selected files stored at the sharing service 115. In some configurations, as shown in the example below, the links 122 may be integrated into the message 109 and operative to allow the recipient of the message 109 to select the one or more links 122 to access the selected files 113.

Figure 5:
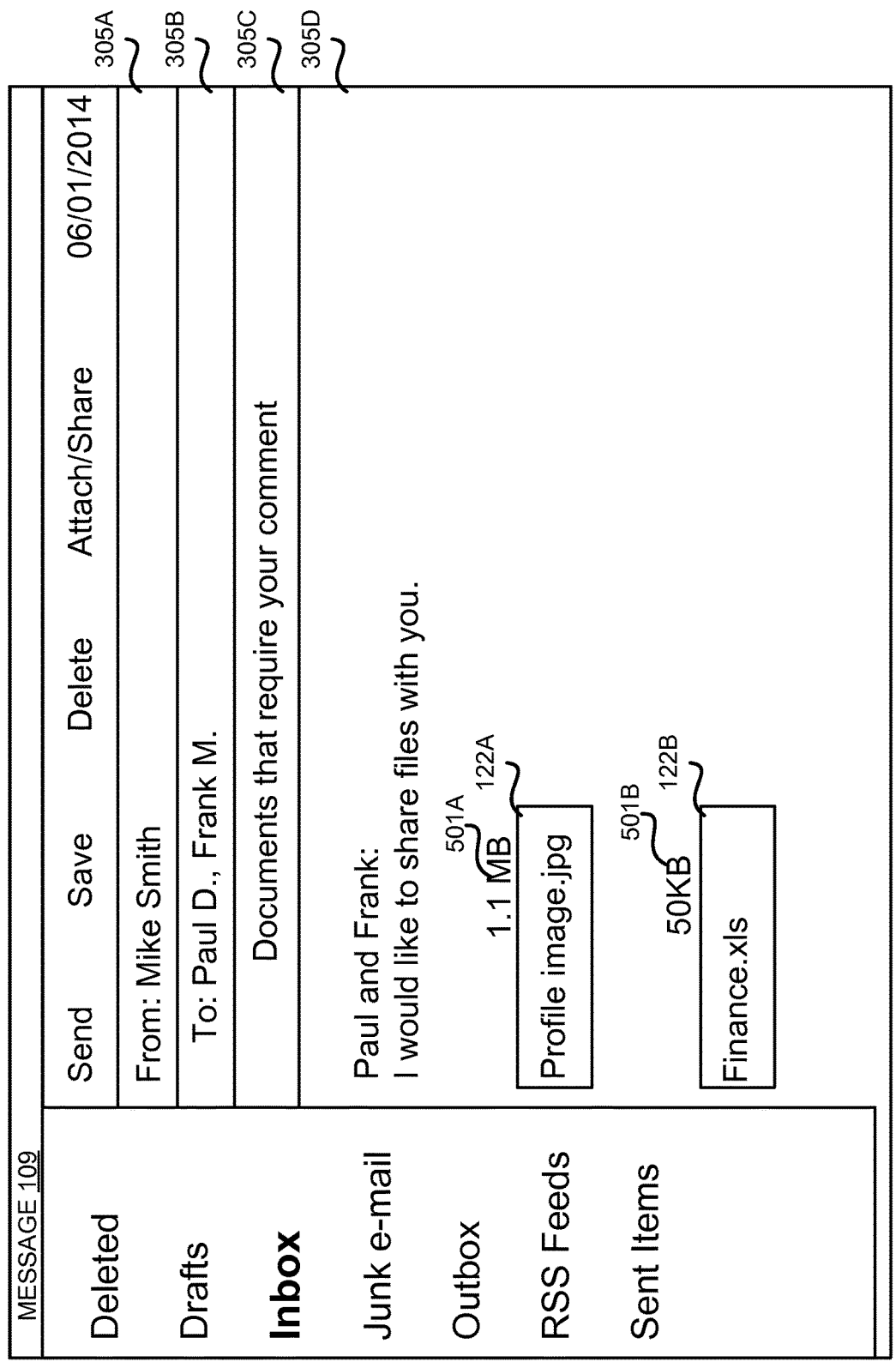
FIG. 5 is a screen diagram showing an illustrative graphical user interface that may display links relating to one or more selected files.

FIG. 5 is a screen diagram showing an illustrative graphical UI 500 that displays the message 109 and the generated links 122A-122B, which are also referred to generically as a "link 122" or "links 122." The UI 500 may be generated by the messaging client 111, shown in FIG. 1, and presented on a computing device, such as the computing device 101A or computing device 101B by an application, such as a web browser application. As shown, the UI 500 illustrated in FIG. 5 is similar to the UI 300 illustrated in FIG. 3 in that the UI 500 contains the "from" UI element 305A for identifying the sender of the message 109, the "recipient" UI element 305B for identifying the recipients of the message 109, the "subject" UI element 305C for specifying the subject of the message 109, message area UI element 305D for entering text of the message 109. As also shown, representations of the generated links 122A-122B may be inserted into the message 109. As can be appreciated, the representations of the generated links 122A-122B may be configured to allow a user to access one or more files 113 by selecting one or more representations of the generated links 122A-122B.

In the current example, the message area UI element 305D shows a first representation of the first generated link 122A, which is may display descriptive information. For instance, the representation of the first generated link 122A may show the filename or other information. In this example, the representation of the first generated link 122A shows an association with the file 113 named "profile image.jpg." In addition, the representation of the second generated link 122B shows the association with the file 113 named "finance.xls."

Also shown in FIG. 5, the message area UI element 305D may also show metadata 501A-501B, which are also referred to generically as "metadata 501." The metadata 501 may include any data or contextual information related to the selected files 113. In the present example, the metadata 501 includes the size of the selected files 113. Although this illustrative example shows a configuration where the links 122A-122B and the metadata 501A-501B are inserted in the message area UI element 305D, the links 122A-122B and the metadata 501A-501B may be configured to appear in any part or element of the UI 500. Once the user is done composing the message 109 and has selected one or more files 113, the user may send the message 109 to the recipient.

Figure 6:
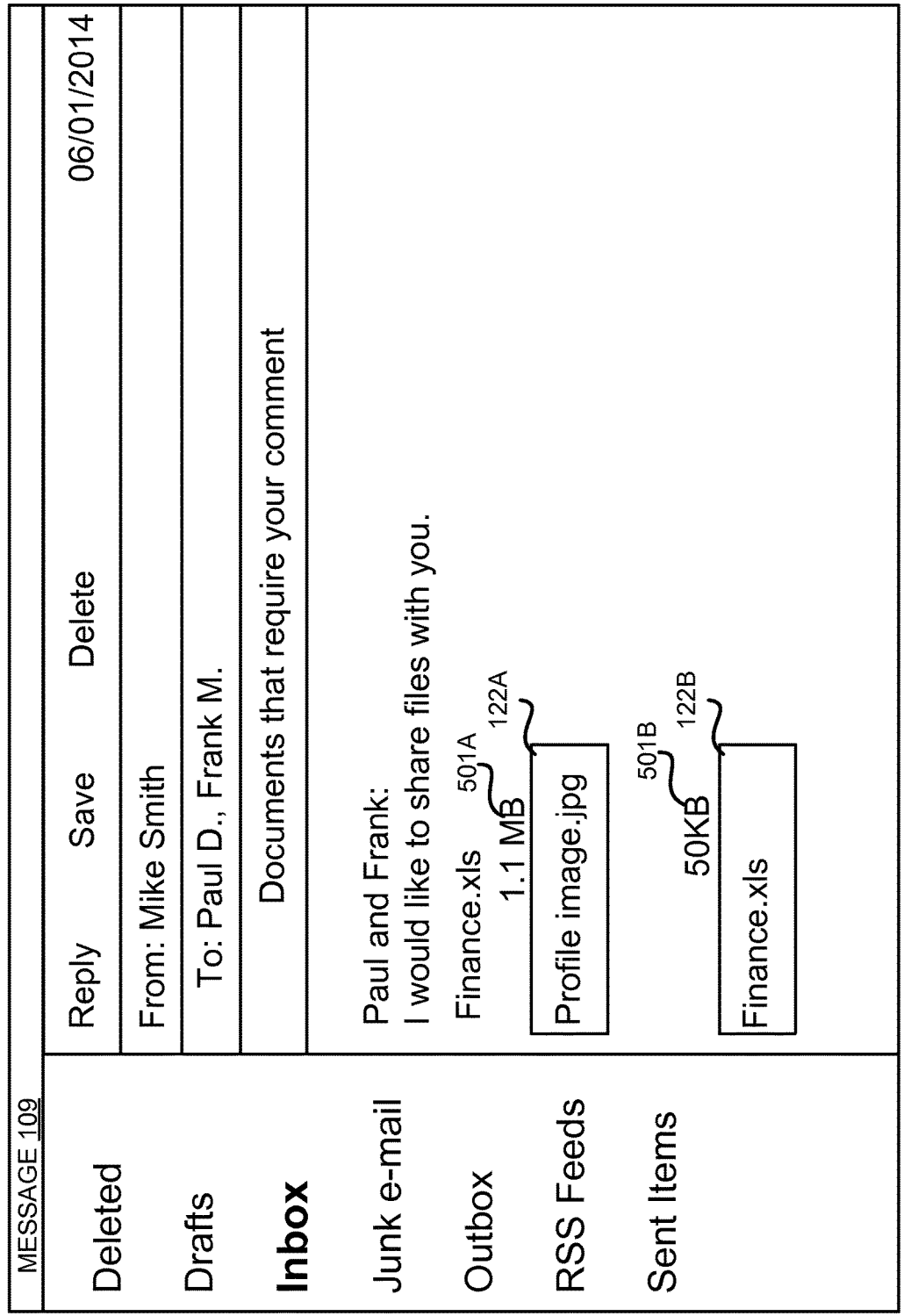
FIG. 6 is a screen diagram showing an illustrative graphical user interface that displays a delivered message including links and other data relating to one or more selected files.

FIG. 6 is a screen diagram showing an illustrative graphical user interface 600 that may be displayed to the recipient after the message 109 has been delivered. As shown, the representations of the generated links 122A-122B the metadata 501A-501B are included in the message 109. As can be appreciated, the representations of the generated links 122A-122B may be configured to allow the recipient of the message 109 to access the associated files 113 by selecting one or more representations of the generated links 122A-122B. Although this example shows the representations of the generated links 122A-122B as selectable rectangular boxes, it can be appreciated that the links 122A-122B may be represented in any format using any descriptive information. In some configurations, the representations may include a full uniform resource locator (URL), images, a generated thumbnail of the files 113, or any other contextual information. In response to the selection of the links 122A-122B, the selected files 113 may be communicated from the sharing service 115 to the computing device 101 of the recipient.

Figure 7:
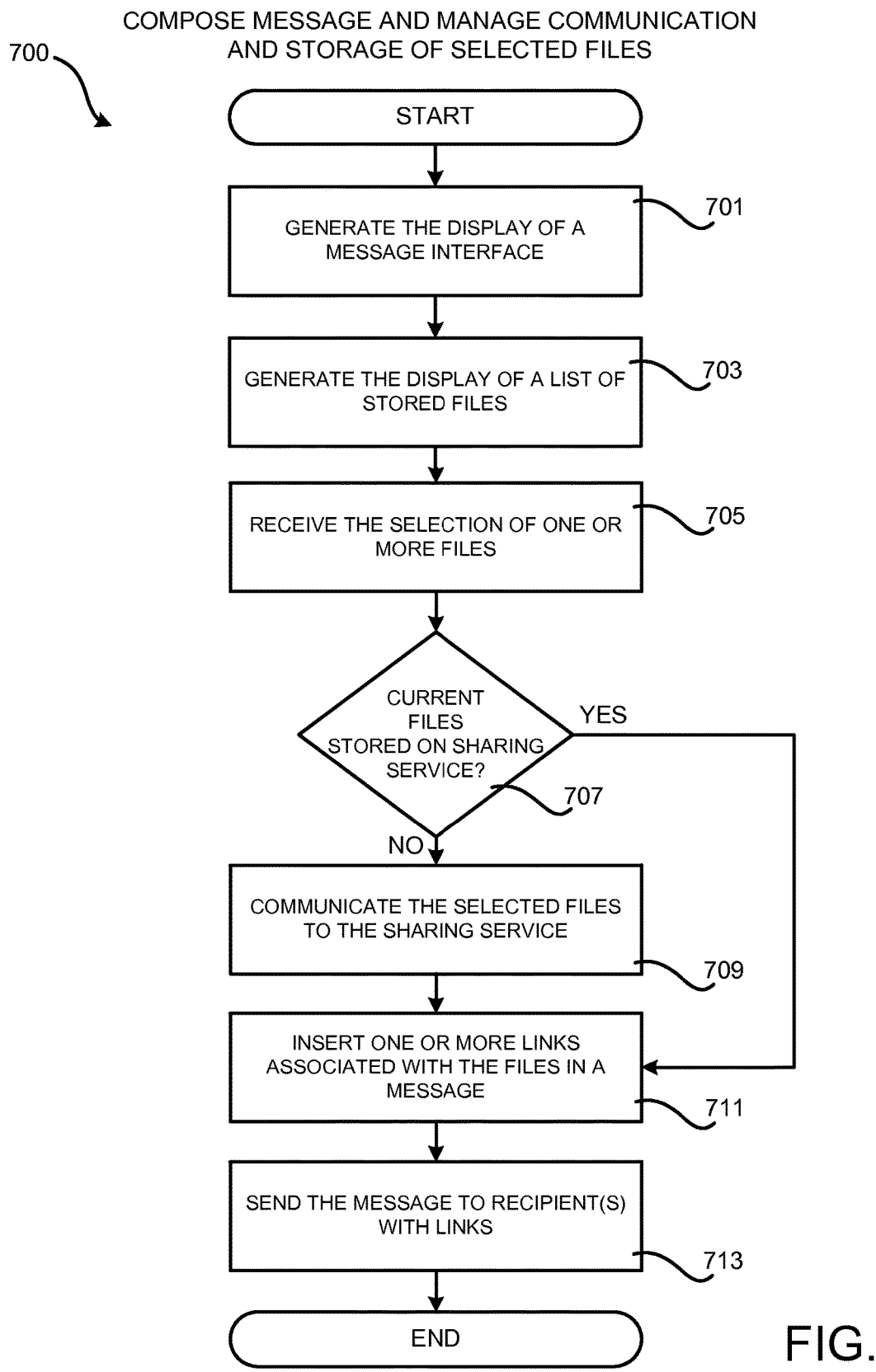
FIG. 7 is a flow diagram showing a routine illustrating aspects of a mechanism disclosed herein for providing enhanced file sharing controls in a messaging client.

FIG. 7 is a flow diagram showing routines that illustrate aspects of techniques for managing the communication and storage of files from within a messaging client, according to examples disclosed herein. It should be appreciated that the logical operations described herein with respect to FIG. 7, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 7 is a flow diagram showing a routine 700 illustrating aspects of a mechanism disclosed herein for managing the communication and storage of files from within a messaging client while composing an electronic message. The routine 700 may begin at operation 701, where the messaging client 111 and/or the messaging service 110 may display a message interface on a computing device 101. As described above, the message interface may include UI elements for composing and communicating data, such as the message 109. In addition, as will be described in more detail below, the message interface may include one or more controls for selecting files to be shared by the sharing service 115.

Next, at operation 703, the messaging client 111 may display a list of stored files. As described above, the list of stored files may include locally stored files 113 or remotely stored files 113. In some configurations, operation 703 may involve a query to obtain a list of file names from a local memory, such as a hard drive of the client computer 101. In addition, operation 703 may involve a query to obtain a list of file names from a service, such as the sharing service 115. The file names may be displayed on a UI, as described above and shown in FIG. 4. Although a UI having file names and graphical representations of the files 113 are shown herein, it can be appreciated that these examples are provided or illustrative purposes and are not to be construed as limiting to a particular type of interface. For example, the API 112 described in FIG. 1, or some other interface (e.g., speech) may be utilized.

Next, at operation 705, the messaging client 111 may receive a selection of one or more files to be shared. As described above, in some configurations, one or more UIs may be configured to receive a user selection of one or more files 113 from the list of files. Graphical representations may be used to highlight selected files and one or more controls may be used to confirm the selection of the one or more files 113. In addition, drag and drop UI features and other selection features may enable aspects of operation 705.

Next, at operation 707, the messaging client 111 may determine if the sharing service 115 contains current versions of the selected files 113. In some configurations of operation 707, the messaging client 111 may access one or more resources of the client computing device 101 to determine if the selected files 113 are stored locally. In addition, the messaging client 111 may access one or more resources of the sharing service 115, such the API 112, to determine if the selected files 113 are stored by the sharing service 115. The API 112 may also be used to determine if the sharing service 115 is storing current versions of the selected files 113. As can be appreciated, any known process for determining the location and/or version of one or more files stored by any computing device or service may be used with the techniques disclosed herein. For example, the respective timestamps of two files can be compared to determine which file is newer and therefore the "current" version.

At decision operation 707, if it is determined that the selected files are not stored at the sharing service 115 or if the sharing service 115 is not storing current versions of the selected files 113, the routine 700 proceeds to operation 709 where the messaging client 111 may communicate the selected files 113 from the client computing device 101 to the sharing service 115 for storage.

At operation 709, the selected files may be communicated to the sharing service 115 and stored in one or more databases, such the file data store 107. As can be appreciated, the selected files 113 may be associated with access rights of one or more identities. Any known technology for communicating files 113 from one computing device to another computing device may be used with techniques disclosed herein.

Upon the completion of operation 709, or if at decision operation 707 it is determined that sharing service 115 is storing current versions of the selected files 113, the routine 700 proceeds to operation 711 where the messaging service 110 and/or the messaging client 111 may insert one or more links 122 into the message interface. As described above, the links 122 may be integrated into any portion of the message interface, including a body of a message 109 that is being composed by the user. Given the techniques disclosed herein, the links 122 may be generated, managed, communicated and inserted into the message or message interface by any module or any combination of modules.

It can be appreciated that although links 122 are used in the illustrative examples, any identifier may be inserted into or associated with the message and/or message interface for associating a stored file 113. More specifically, any code, control or data structure capable of providing access to a stored file from the message interface or message may be used with the techniques described herein. In addition, as summarized above, the links 122 may be generated by any computing device or service, such as the sharing service 115 or the messaging service 110. Any computing device or service that stores the selected files or has access to data identifying the files, such as the file identifier 114, may generate the one or more links 122.

From operation 711, the routine 700 may proceed to operation 713, where the message generated by the use of the message interface is communicated to one or more recipients. In operation 713, the message may be sent by the messaging service 110 to the recipients of the message. As described above, the message may include the links 122 and/or other identifiers that provide access to the selected files 113. Upon the completion of operation 713, the routine 700 terminates.

Figure 8:
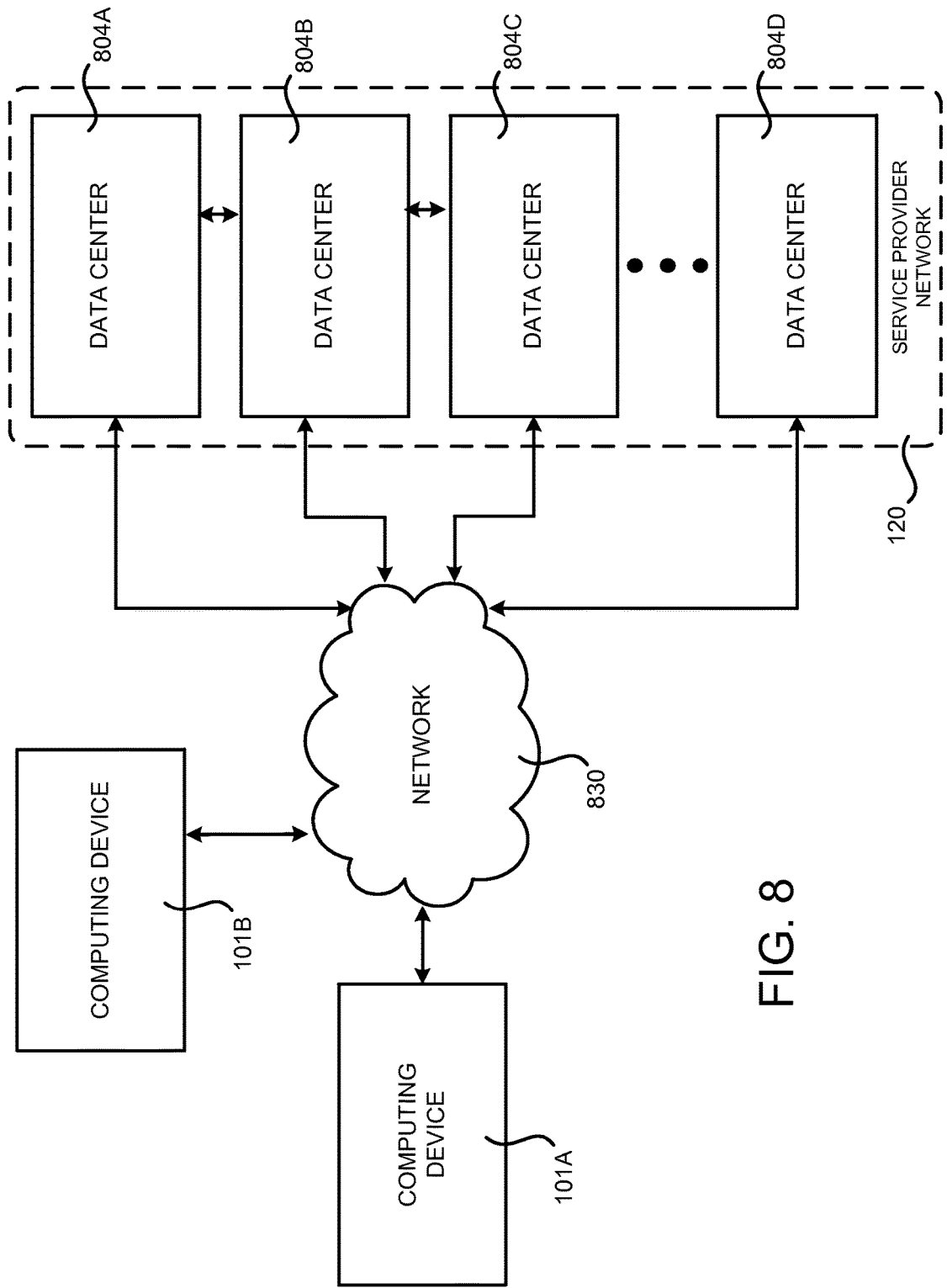
FIG. 8 is a system and network diagram that shows one illustrative operating environment for examples disclosed herein that includes a service provider network.

FIG. 8 and the following description are intended to provide a brief, general description of a suitable computing environment in which the technologies described herein may be implemented. In particular, FIG. 8 is a system and network diagram that shows an illustrative operating environment that includes a service provider network 120. As discussed above, the service provider network 120 can provide virtual machine instances and computing resources on a permanent or an as-needed basis.

The computing resources provided by the service provider network 120 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 120 are enabled in one implementation by one or more data centers 804A-804N (which may be referred to herein singularly as "a data center 804" or collectively as "the data centers 804"). The data centers 804 are facilities utilized to house and operate computer systems and associated components. The data centers 804 typically include redundant and backup power, communications, cooling and security systems. The data centers 804 might also be located in geographically disparate locations. One illustrative configuration for a data center 804 that implements some or all of the concepts and technologies disclosed herein for annotating resources in the service provider network 120 will be described below with regard to FIG. 9.

The users and customers of the service provider network 120 may access the computing resources provided by the data centers 804 over a suitable data communications network, such as a Wide Area Network ("WAN"), as illustrated by the network 830. Although a WAN might be used, it should be appreciated that a local-area network ("LAN"), the Internet, or any other networking topology known in the art that connects the data centers 804 to the computing device 101A, and the computing device 101B may be utilized. It should also be appreciated that combinations of such networks might also be utilized.

Figure 9:
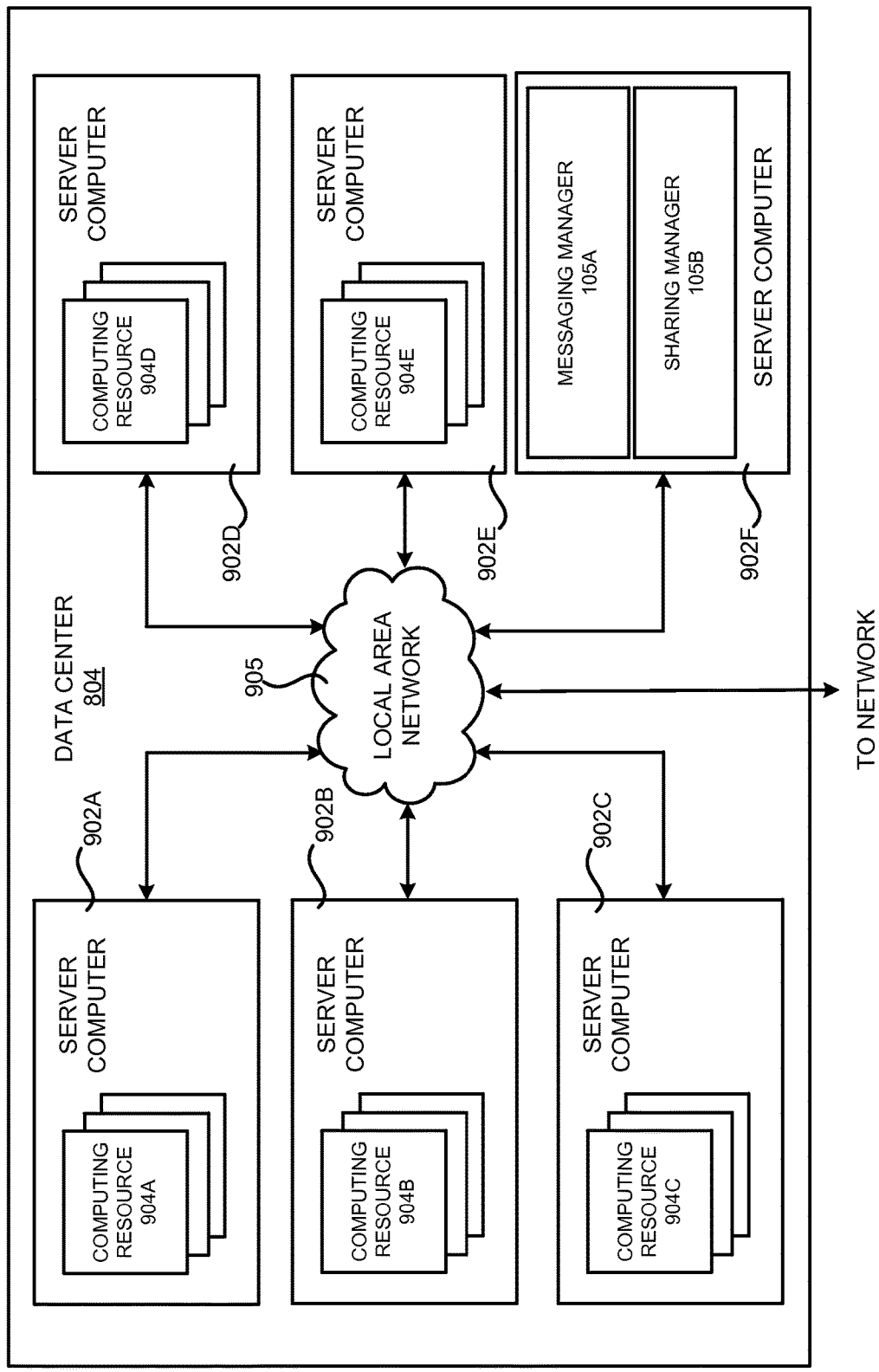
FIG. 9 is a computing system diagram that illustrates one configuration for a data center that implements aspects of the concepts and technologies disclosed herein for providing enhanced file sharing controls in a messaging client.

FIG. 9 is a computing system diagram that illustrates one configuration for a data center 804 that implements aspects of a service provider network 120, including some or all of the concepts and technologies disclosed herein for setting permissions for files to be shared using a messaging client 111. The example data center 804 shown in FIG. 9 includes several server computers 902A-902F (which may be referred to herein singularly as "a server computer 902" or in the plural as "the server computers 902") for providing computing resources. The server computers 902 may be standard tower or rack-mount server computers configured appropriately for providing the computing resources described herein. According to one configuration, the server computers 902 are configured to execute the software products as described above.

In one example, some of the computing resources 904 are virtual machine instances. As known in the art, a virtual machine instance is an instance of a software implementation of a machine (i.e. a computer) that executes programs like a physical machine. Each of the server computers 902 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 902, for example.

It should be appreciated that although the technologies disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 804 shown in FIG. 9 also includes a server computer 902F reserved for executing software components for managing the operation of the data center 804, server computers 902, virtual machine instances, and other resources within the service provider network 120. The server computer 902F might also execute the messaging manager 105A and/or the sharing manager 105B. Details regarding the operation of each of these components has been provided above. In this regard, it should be appreciated that while these components are illustrated as executing within the service provider network 120, computing systems that are external to the service provider network 120 might also be utilized to execute some or all of these components. Other configurations might also be utilized.

In the example data center 804 shown in FIG. 9, an appropriate local area network ("LAN") 905 is utilized to interconnect the server computers 902A-902E and the server computer 902F. The LAN 905 is also connected to the network 830 illustrated in FIG. 8. It should be appreciated that the configuration and network topology illustrated in FIGS. 8 and 9 has been greatly simplified and that many more computing systems, networks and networking devices may be utilized to interconnect the various computing systems disclosed herein. Appropriate load balancing devices or software modules might also be utilized for balancing a load between each of the data centers 804A-804N, between each of the server computers 902A-902F in each data center 804 and between virtual machine instances and other types of computing resources provided by the service provider network 120.

It should be appreciated that the data center 804 described in FIG. 9 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 10:
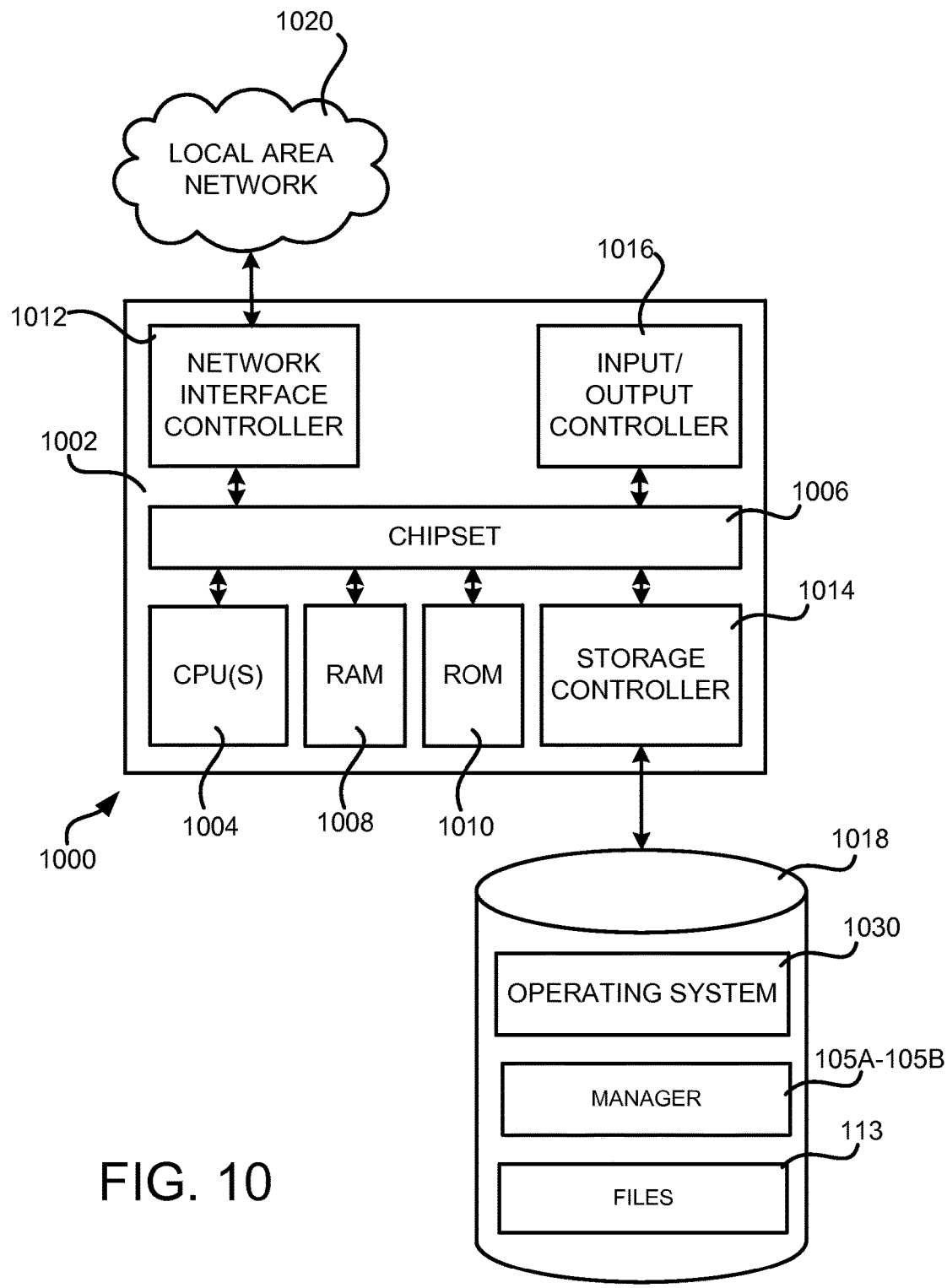
FIG. 10 is a computer architecture diagram showing an illustrative computer hardware architecture for implementing a computing device that might be utilized to implement aspects of the various technologies presented herein.

FIG. 10 shows an example computer architecture for a computer 1000 capable of executing program components for providing enhanced file sharing controls in a messaging client in the manner described above. The computer architecture shown in FIG. 10 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 10 may be utilized to execute software components for performing operations as described above. The computer architecture shown in FIG. 10 might also be utilized to implement a computing device 101A or 101B or any other of the computing systems described herein.

The computer 1000 includes a baseboard 1002, or "motherboard," which is a printed circuit board to which a multitude of components or devices may be connected by way of a system bus or other electrical communication paths. In one illustrative configuration, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 1006 provides an interface between the CPUs 1004 and the remainder of the components and devices on the baseboard 1002. The chipset 1006 may provide an interface to a RAM 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the various configurations described herein.

The computer 1000 may operate in a networked environment using logical connections to remote computing devices and computer systems through a network, such as the local area network 1020. The chipset 1006 may include functionality for providing network connectivity through a network interface controller (NIC) 1012, such as a gigabit Ethernet adapter. The NIC 1012 is capable of connecting the computer 1000 to other computing devices over the local area network 1020. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 1018 may store other system or application programs and data utilized by the computer 1000, such as components that include the managers 105A-105B, the files 113, and/or any of the other software components and data described above. The mass storage device 1018 might also store other programs and data not specifically identified herein.

In one example, the mass storage device 1018 or other computer-readable storage media is encoded with computer-executable instructions which, when loaded into the computer 1000, transform the computer from a general-purpose computing system into a special-purpose computer capable of implementing the examples described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various routines described above with regard to FIG. 7. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for providing enhanced file sharing controls in a messaging client have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method, comprising:
 causing a display of a message interface on a first computer, the message interface configured to compose an electronic message that is to be delivered by a messaging service to a recipient, the message interface comprising a user interface element dedicated to initiate sharing of a file via a sharing service without initiating attachment of the file to the electronic message, the sharing service configured to store shared files and a plurality of user records, wherein individual user records of the plurality of user records are associated with individual files of the shared files;
 causing a display of a plurality of files on the first computer responsive to selection of the user interface element, the plurality of files including local files stored on the first computer and the shared files stored at the sharing service;
 receiving, by the first computer, a selection of a selected file, the selected file being one of the plurality of files;
 determining a user record associated with the selected file, the user record comprising at least user comments corresponding to the selected file;
 determining user permissions associated with the user record, the user permissions defining access rights to at least the user comments;
 based at least in part on receiving the selection,
  generating, by the first computer, a graphical representation of a link that when selected accesses the file stored at the sharing service;
  inserting, by the first computer, the graphical representation of the link into the electronic message without initiating attachment of the selected file to the electronic message;
  causing, by the first computer, display of the graphical representation of the link within the electronic message within the message interface;
  causing, by the first computer and based at least in part on the user permissions, display of at least a portion of the user comments; and
  sending, by the first computer, a request to at least one of the sharing service or a second computer to cause the selected file to be communicated from a second computer to the sharing service for storage based at least in part the sharing service not storing a latest version of the selected file.

2. The computer-implemented method of claim 1, further comprising:
 based at least in part on receiving the selection, and prior to inserting the graphical representation of the link into the electronic message and receiving a user instruction to send the electronic message:
  determining that the sharing service will store the latest version of the file after the second computer communicates the selected file to the sharing service,
  causing an identifier associated with the file to be communicated from the first computer to the sharing service, and
  generating the link to retrieve the file stored at the sharing service, wherein the link is based on the identifier.

3. The computer-implemented method of claim 2, further comprising receiving, at the first computer, the link from the sharing service.

4. The computer-implemented method of claim 2, wherein receiving, by the first computer, a selection of a selected file causes communication of the link from the sharing service to the messaging service.

5. The computer-implemented method of claim 1, further comprising receiving, at the first computer, the link generated by the sharing service.

6. The computer-implemented method of claim 1, further comprising receiving, at the first computer, an identifier associated with the file from the sharing service, and generating, by the first computer, the link based on the identifier.

7. The computer-implemented method of claim 1, wherein receiving, by the first computer, a selection of a selected file causes receiving, at the messaging service, an identifier associated with the file from the sharing service, and generating, at the messaging service, the link based on the identifier.

8. An apparatus, comprising:
at least one processor; and
a non-transitory computer-readable storage medium having computer-executable instructions stored thereon which, when executed on the at least one processor, cause the apparatus to:
cause a display of a message interface on the apparatus, the message interface configured to compose an electronic message that is to be delivered by a messaging service to a recipient, the message interface comprising a user interface element dedicated to initiate sharing of a file via a sharing service without initiating attachment of the file to the electronic message, the sharing service configured to store shared files and a plurality of user records, wherein individual user records of the plurality of user records are associated with individual files of the shared files,
based at least in part on detecting a user selection of the user interface element, cause a display of a plurality of files, the plurality of files including at least the shared files,
prior to adding one or more graphical representations of one or more links to the electronic message and receiving a user instruction to send the electronic message, obtain the one or more links and insert the one or more graphical representations of the one or more links in the electronic message, wherein the one or more links are operative to access the file while stored at the sharing service,
determine a user record associated with the file, the user record comprising at least user comments corresponding to the file,
determine user permissions associated with the user record, the user permissions defining access rights to at least the user comments,
cause display of the one or more graphical representations of the one or more links within the electronic message within the message interface before receiving the user instruction to send the electronic message,
based at least in part on the user permissions, cause display of at least a portion of the user comments, and
cause the file to be communicated from a computing device to the sharing service for storage based at least in part on the sharing service not storing a latest version of the file.

9. The apparatus of claim 8, wherein the instructions further cause the apparatus to receive an identifier associated with the file from the sharing service, and wherein obtain the one or more links comprises generating the one or more links based on the identifier.

10. The apparatus of claim 8, wherein the instructions further cause the apparatus to:
prior to adding the one or more graphical representations of the one or more links to the electronic message and receiving a user instruction to send the electronic message, determine that the sharing service is storing the file; and
in response to determining that the sharing service is storing the file, communicate an identifier associated with the file to the sharing service, wherein obtain the one or more links comprises receiving the one or more links from the sharing service, and wherein the one or more links are based on the identifier.

11. The apparatus of claim 8, wherein obtain the one or more links comprises the apparatus obtaining the one or more links from the sharing service.

12. The apparatus of claim 8, wherein obtain the one or more links comprises the apparatus obtaining the one or more links from the messaging service.

13. The apparatus of claim 8, wherein the plurality of files includes local files stored on the apparatus and shared files stored at the sharing service.

14. A non-transitory computer-readable storage medium having computer-executable instructions stored thereupon which, when executed by a first computer, cause the first computer to:
cause a display of a message interface on the first computer, the message interface configured to compose an electronic message that is to be delivered by a messaging service to a recipient, the message interface comprising a user interface element dedicated to initiate sharing of a file via a sharing service without initiating attachment of the file to the electronic message, the sharing service configured to store shared files and a plurality of user records, wherein individual user records of the plurality of user records are associated with individual files of the shared files;
based at least in part on detecting a user selection of the user interface element, cause a display of a plurality of files, the plurality of files including at least the shared files;
receive a selection of a file from the displayed plurality of files;
determine a user record associated with the file, the user record comprising at least user comments corresponding to the file;
determine user permissions associated with the user record, the user permissions defining access rights to at least the user comments;
prior to adding one or more graphical representations of one or more links to the file to the electronic message and receiving a user instruction to send the electronic message, cause a second computer to communicate the file from the second computer to the sharing service for storage of the file at the sharing service based at least in part on the sharing service not storing a current version of the file;
obtain the one or more links operative to access the file stored at the sharing service;
insert one or more graphical representations of the one or more links in the electronic message;
cause display of the one or more graphical representations of the one or more links within the electronic message within the message interface before receiving the user instruction to send the electronic message; and
based at least in part on the user permissions, cause display of at least a portion of the user comments.

15. The non-transitory computer-readable storage medium of claim 14, wherein the instructions further cause the first computer to receive an identifier associated with the file from the sharing service, and wherein obtain the one or more links comprises generating the one or more links based on the identifier.

16. The non-transitory computer-readable storage medium of claim 14, wherein the instructions further cause the first computer to:
   determine that the sharing service is storing the file prior to adding the one or more graphical representations of the one or more links to the file to the electronic message and receiving a user instruction to send the electronic message; and
   in response to determining that the sharing service is storing the file, communicate an identifier associated with the file to the sharing service, wherein obtain the one or more links comprises receiving the one or more links from the sharing service, and wherein the one or more links are based on the identifier.

17. The non-transitory computer-readable storage medium of claim 14, wherein obtain the one or more links comprises receiving the one or more links from the sharing service.

18. The non-transitory computer-readable storage medium of claim 14, wherein obtain the one or more links comprises receiving the one or more links from the messaging service.

19. The non-transitory computer-readable storage medium of claim 14, wherein obtain the one or more links operative to access the file stored at the sharing service occurs prior to adding the one or more links to the file to the electronic message and receiving a user instruction to send the electronic message.

20. The non-transitory computer-readable storage medium of claim 14, wherein the plurality of files includes local files stored on the first computer and shared files stored at the sharing service.

* * * * *